United States Patent
Huo et al.

(10) Patent No.: US 7,589,803 B2
(45) Date of Patent: Sep. 15, 2009

(54) BACKLIGHT UNIT AND LIQUID CRYSTAL DISPLAY MODULE USING THE SAME

(75) Inventors: Dong Im Huo, Gumi-si (KR); Jeong Jo Lee, Paju-si (KR)

(73) Assignee: LG. Display Co., Ltd., Seoul (KR)

( * ) Notice: Subject to any disclaimer, the term of this patent is extended or adjusted under 35 U.S.C. 154(b) by 294 days.

(21) Appl. No.: 11/478,806

(22) Filed: Jun. 30, 2006

(65) Prior Publication Data

US 2007/0091222 A1    Apr. 26, 2007

(30) Foreign Application Priority Data

Oct. 24, 2005    (KR)  .................. 10-2005-0100308

(51) Int. Cl.
| | |
|---|---|
| *G02F 1/1335* | (2006.01) |
| *G09F 13/04* | (2006.01) |
| *G02F 1/1333* | (2006.01) |
| *A47F 3/00* | (2006.01) |
| *H03H 9/00* | (2006.01) |

(52) U.S. Cl. .................. 349/65; 349/67; 362/97; 362/561; 362/608

(58) Field of Classification Search .................. 349/64, 349/67, 65; 362/97.1, 97.2, 561, 608, 609
See application file for complete search history.

(56) References Cited

U.S. PATENT DOCUMENTS

| | | | | |
|---|---|---|---|---|
| 5,788,356 A | * | 8/1998 | Watai et al. .................. 362/621 |
| 6,295,105 B1 | * | 9/2001 | Lee et al. .................. 349/65 |
| 6,435,685 B2 | * | 8/2002 | Matsushita .................. 362/608 |
| 6,690,435 B1 | * | 2/2004 | Ha et al. .................. 349/61 |
| 6,788,358 B1 | * | 9/2004 | Kim et al. .................. 349/62 |
| 7,118,266 B2 | * | 10/2006 | Matsushita .................. 362/609 |
| 7,126,650 B2 | * | 10/2006 | Nagahama .................. 349/58 |
| 7,261,457 B2 | * | 8/2007 | Inoue .................. 362/609 |
| 2003/0048629 A1 | * | 3/2003 | Kim et al. .................. 362/27 |
| 2005/0036296 A1 | * | 2/2005 | Kim et al. .................. 362/31 |
| 2005/0099790 A1 | * | 5/2005 | Kang et al. .................. 362/31 |

* cited by examiner

*Primary Examiner*—Uyen Chau N Le
*Assistant Examiner*—Rhonda S Peace
(74) *Attorney, Agent, or Firm*—Brinks Hofer Gilson & Lione

(57) ABSTRACT

This invention relates to a backlight unit that prevents a wrinkle of an optical sheet, and a liquid crystal display module using the same. A backlight includes at least one light source. A light guide panel converts a light from the light source into a surface light. A housing receives the light source, and has an open part that is opened to a light incidence surface of the light guide panel and one end overlaps with at least a part of the light guide panel. A main support encompasses side and upper surfaces of the housing. Optical sheets disposed on the light guide panel, wherein the optical sheets have one ends disposed between the light guide panel and the one end of the housing.

28 Claims, 12 Drawing Sheets

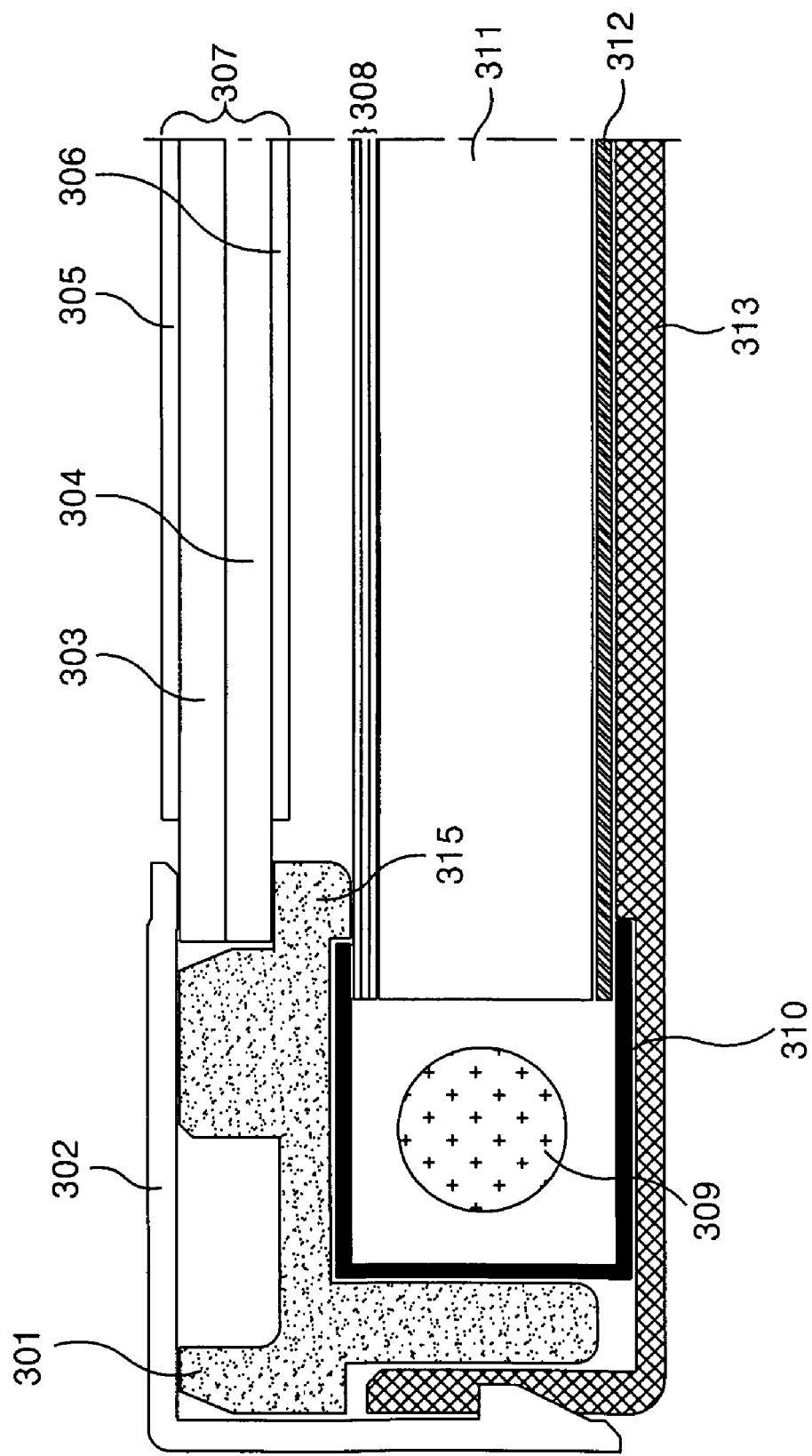

BACKLIGHT UNIT AND LIQUID CRYSTAL DISPLAY MODULE USING THE SAME

This application claims the benefit of the Korean Patent Application No. P2005-0100308 filed on Oct. 24, 2005 which is hereby incorporated by reference.

BACKGROUND

1. Field

A liquid crystal display module that prevents a wrinkle of an optical sheet is provided.

2. Related Art

A CRT (cathode ray tube) is a display device that can be used in, for example, a monitor of a measuring instrument, an information terminal, and a TV. However, the CRT's large weight and size is not beneficial to the demand of does not an electronic appliances smaller and lighter.

The display devices that are expected to replace the CRT include, for example, a liquid crystal display LCD using an electric field optical effect, a plasma display panel PDP using a gas discharge, an organic light emitting diode OLED using an field effect luminous effect.

The liquid crystal display device that has advantages such as compact size, light weight and low power consumption has recently been developed to act as a flat panel display. The LCD is used, for example, in desktop computer monitors and notebook computer monitors, thus the demand for the liquid crystal display device is continuously increasing.

Because the liquid crystal display device is not a self-luminous display device the LCD needs a separate light source, for example, a backlight unit. The liquid crystal display device includes a liquid crystal display module includes a backlight unit and a liquid crystal display panel that realizes a picture by use of the light from the backlight unit. A drive circuit part drives the liquid crystal display module.

As shown in FIG. 1, a liquid crystal display module of the related art includes a light source 9. A light guide panel 11 converts the light from the light source into a surface light. A housing 10 receives the light source 9 and has an opening part opened to a light incidence surface side of the light guide panel 11. A main support 1 encompasses the side surface and upper surface of the housing 10 and supports the liquid crystal display panel. A backlight unit includes a plurality of optical sheets 8 disposed on the light guide panel 11 and a reflection plate 12 installed to face the lower surface of the light guide panel 11. A liquid crystal display panel 7 irradiates the light from the backlight unit to display a picture. A case supports the whole liquid crystal display module and protects the liquid crystal display module from an external impact. A cover bottom 12 and a case top 2 being a sash member.

The liquid crystal display panel 7 includes an upper plate 3 where a black matrix, a color filter array, a common electrode and an alignment film are sequentially formed on a substrate. A lower plate 4 has a TFT array, a pixel electrode and an alignment film sequentially formed on a substrate. An upper polarizer 5 is disposed on the upper plate. A lower polarizer 6 is disposed under the lower plate. A spacer (not shown) maintains a gap between the upper plate and the lower plate. A liquid crystal layer is injected into a space between the upper/lower plates 3, 4. The upper and lower plates 3, 4 are bonded together by a sealant.

The backlight unit includes a light source 9. A light guide panel 11 converts the light from the light source into a surface light. A housing 10 receives the light source 9 and an opening part opened to a light incidence surface side of the light guide panel 11. A support main 1 encompasses the side surface and upper surface of the housing 10 and supports the liquid crystal display panel. A plurality of optical sheets 8 are disposed on the light guide panel 11. A reflection plate 12 is installed to face the lower surface of the light guide panel 11.

The light source generates light. A cold cathode fluorescent lamp CCFL, a hot cathode fluorescent lamp (HCFL), an external electrode fluorescent lamp (EEFL), a light emitting diode (LED) may be used as such a light source 9.

The light guide panel 11 converts the incident light from the light source 9 through the light incidence part of the side surface into a surface light. The light guide panel 11 is generally formed of a transparent acryl resin that has high strength so as not to be broken or deformed easily.

The housing 10 of a metal material is formed to have a shape that encompasses the light source 9. The reflection plate is bonded to the inner surface, or a metal of a reflective material is coated on the inner surface in order to reduce the loss of the light that is incident from the light source 9 to the light guide panel 11.

The reflection plate 12 is located in the lower part of the light guide panel 11 to reflect the light that progresses to the lower surface of the light guide panel 11 and to the upper surface of the light guide panel, thereby reducing light loss.

Optical sheets 8 are located between the light guide panel 11 and the liquid crystal display panel 7. The optical sheets 8 uniformly disperse the light from the light guide panel 7 to the picture display part of the liquid crystal display panel 7 that is supplied thereto, and increases light efficiency. The optical sheets 8 are disposed on the upper part of the light guide panel 11. The optical sheets 8 include a diffusion sheet that makes a picture that is displayed in the liquid crystal display panel 7 have an evenly-distributed brightness by way of making the incident light from the light guide panel 11 dispersed to the whole surface of the picture display part of the liquid crystal display panel 7 to be supplied thereto. A prism sheet increases the brightness of the picture displayed in the liquid crystal display panel 7 by making the incident light from the diffusion sheet process in a fixed direction by an angle and a pitch of a prism shape. A protection sheet protects the prism sheet.

The main support is encompasses the upper surface and side surface of the housing 10, the edge of the upper surface of the light guide panel 11 and the edge of the optical sheets 8. The main support fixes the optical sheets 8 and supports the the liquid crystal display module. The main support 1 is formed of a plastic material by molding.

The bottom cover 13 is installed to encompass the lower surface of the liquid crystal display module and the side surface of the main support 1. The bottom cover 109 is formed of a metal material, for example, aluminum.

The top case 2 is installed to encompass the upper surface and side surface of the main support 1 and the edge of the liquid crystal display panel 7, and is combined with the cover bottom 13 in the side surface of the main support 1. The top case 2 encompasses the edge of the liquid crystal display panel 7 to protect the liquid crystal display panel from an external impact.

The optical sheets 8 are deposited on the light guide panel 11 and are fixed with a pressure applied thereto by a projected part of the main support 1. There are many cases that a gap is generated between the light guide panel 11 and the main support 1 due to the material of the main support 1 being made from plastic.

As shown in FIG. 2, when a gap exist, a wrinkle 14 is formed in the optical sheets 8. FIG. 2 represents a cross section of a liquid crystal display module, cut along the line A-A'. If the wrinkle 14 is formed in the optical sheets 8 the picture displayed in the liquid crystal display panel 7 is distorted at a location where the wrinkle 14 is formed, as shown in FIG. 3, thereby deteriorating picture quality. The wrinkle 14 formed in the optical sheets 8 is connected to a defect of a product in accordance of the degree thereof. The defect of the product decreases its yield, the defect thus creates a cost increase. The product that has a defect caused by the wrinkle 14 is considered a good product and is distributed; however, the picture quality deteriorated by the wrinkle 14 lowers the reliability of the product.

SUMMARY

A liquid crystal display module that is imporves picture quality by preventing a wrinkle from being formed in optical sheets is provided.

A backlight unit includes at least one light source. A light guide panel converts a light from the light source into a surface light. A housing receives the light source, and has an opening part opened to a light incidence surface of the light guide panel and one end overlaps with at least a part of the light guide panel. A main support encompasses the side and upper surfaces of the housing. Optical sheets are disposed on the light guide panel, wherein the optical sheets have one end inserted between the light guide panel and the other end inserted in the housing.

In the backlight unit, the main support includes a projected part that is extends from the one end of the housing and overlaps with at least a part of the light guide panel with a space therebetween.

In the backlight unit, the one ends of the optical sheets are inserted into a space between the light guide panel and the one end of the main support.

In the backlight unit, the one ends of the optical sheets are disposed between the light guide panel and the one end of the main support and the one end of the housing.

In the backlight unit, the light source includes a first light source disposed in one side of the light guide panel, and a second light source disposed in the other side of the light guide panel. The housing includes a first housing that receives the first light source, and has an open part that is opened to a first light incidence surface of the light guide panel and one end overlapped with the light guide panel. A second housing receives the second light source, and has an open part that is opened to a second light incidence surface of the light guide panel and one end overlaps with the light guide panel. The main support encompasses side and upper surfaces of the first and second housings.

In the backlight unit, the one ends of the optical sheets are disposed between the light guide panel and the one end of the first housing. The other ends of the optical sheets are disposed between the light guide panel and the one end of the second housing.

The backlight unit further includes a reflection plate installed to face a lower surface of the light guide panel. The housing has one end that overlaps with an upper surface of the light guide panel where the optical sheets are disposed. The other end overlaps with a lower surface of the light guide panel.

The backlight unit further includes a reflection plate installed to face a lower surface of the light guide panel. The housing has one end that overlaps with an upper surface of the light guide panel where the optical sheets are disposed. The other end overlaps with the reflection plate and a lower surface of the light guide panel.

A liquid crystal display module according to another embodiment includes a liquid crystal display panel where an upper plate and a lower plate are bonded together and liquid crystal molecules are injected between the upper and lower plates. A backlight unit includes at least one light source. A light guide panel converts a light from the light source into a surface light. A housing receives the light source, and has an open part that is opened to a light incidence surface of the light guide panel. One end overlaps with at least a part of the light guide panel. A main support encompasses side and upper surfaces of the housing. Optical sheets are disposed on the light guide panel. The optical sheets have one ends disposed between the light guide panel and the one end of the housing.

In the liquid crystal display module, the main support includes a projected part that extends from the one end of the housing and to be overlaps with at least a part of the light guide panel with a space therebetween.

In the liquid crystal display module, the one ends of the optical sheets are disposed between the light guide panel and the one end of the main support.

In the liquid crystal display module, the one ends of the optical sheets are disposed between the light guide panel and the one end of the support main and the one end of the housing.

In the liquid crystal display module, the light source includes a first light source disposed in one side of the light guide panel, and a second light source disposed in the other side of the light guide panel. The housing includes a first housing that receives the first light source and has an open part that is opened to a first light incidence surface of the light guide panel and one end overlapped with the light guide panel. A second housing receives the second light source and has an open part that is opened to a second light incidence surface of the light guide panel and one end overlaps with the light guide panel. The main support encompasses side and upper surfaces of the first and second housings.

In the liquid crystal display module, the one ends of the optical sheets are disposed between the light guide panel and the one end of the first housing. The one ends of the optical sheets are inserted into a space formed between the light guide panel and the one end of the second housing.

The liquid crystal display module further includes a reflection plate installed to face a lower surface of the light guide panel. The housing has one end that overlaps with an upper surface of the light guide panel where the optical sheets are disposed. The other end overlaps with a lower surface of the light guide panel.

The liquid crystal display module further includes a reflection plate installed to face a lower surface of the light guide panel. The housing has one end that overlaps with an upper surface of the light guide panel where the optical sheets are disposed. The other end overlaps with the reflection plate and a lower surface of the light guide panel.

DRAWINGS

In the drawings:

FIG. 8 is a cross sectional diagram that illustrates a liquid crystal display module according to a third embodiment.

DESCRIPTION

Reference will now be made in detail to the preferred embodiments, examples that are illustrated in the accompanying drawings.

A liquid crystal display module according to a first embodiment will be explained in detail with reference to FIGS. 4, 5A and 5B.

Figure 1:
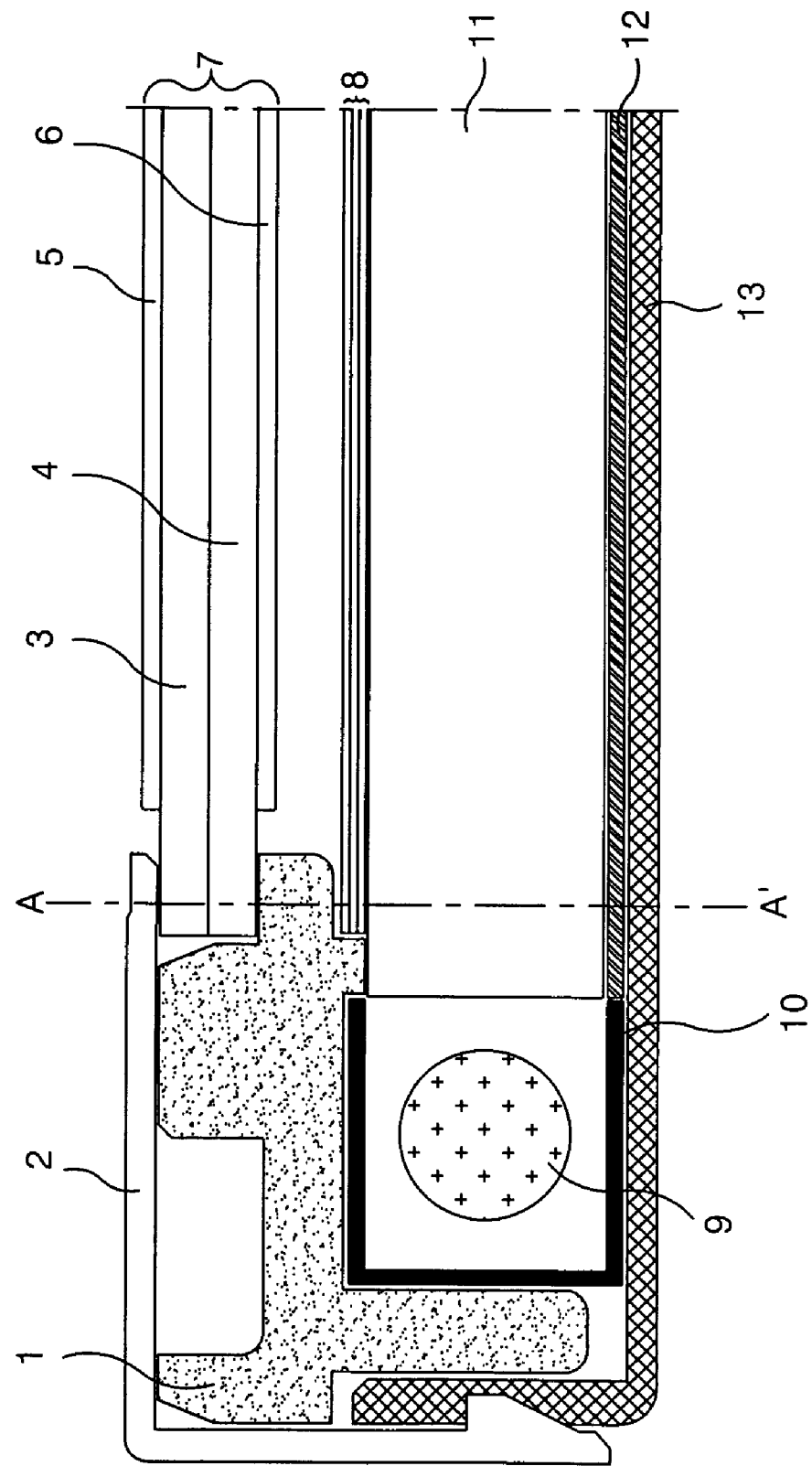
FIG. 1 is a cross sectional view that illustrates a liquid crystal display module according to the related art.
Figure 2:
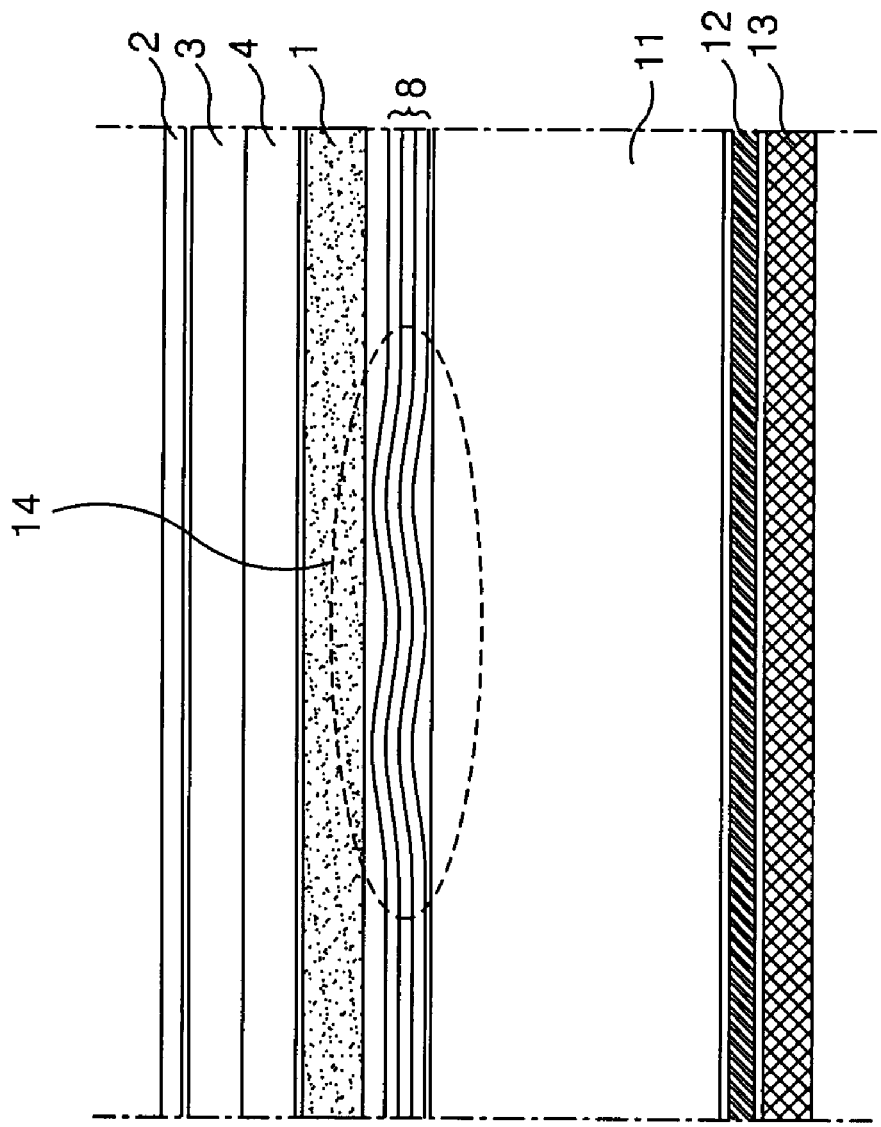
FIG. 2 is a cross sectional view that illustrates a wrinkle generated at an optical sheet of FIG. 1.
Figure 3:
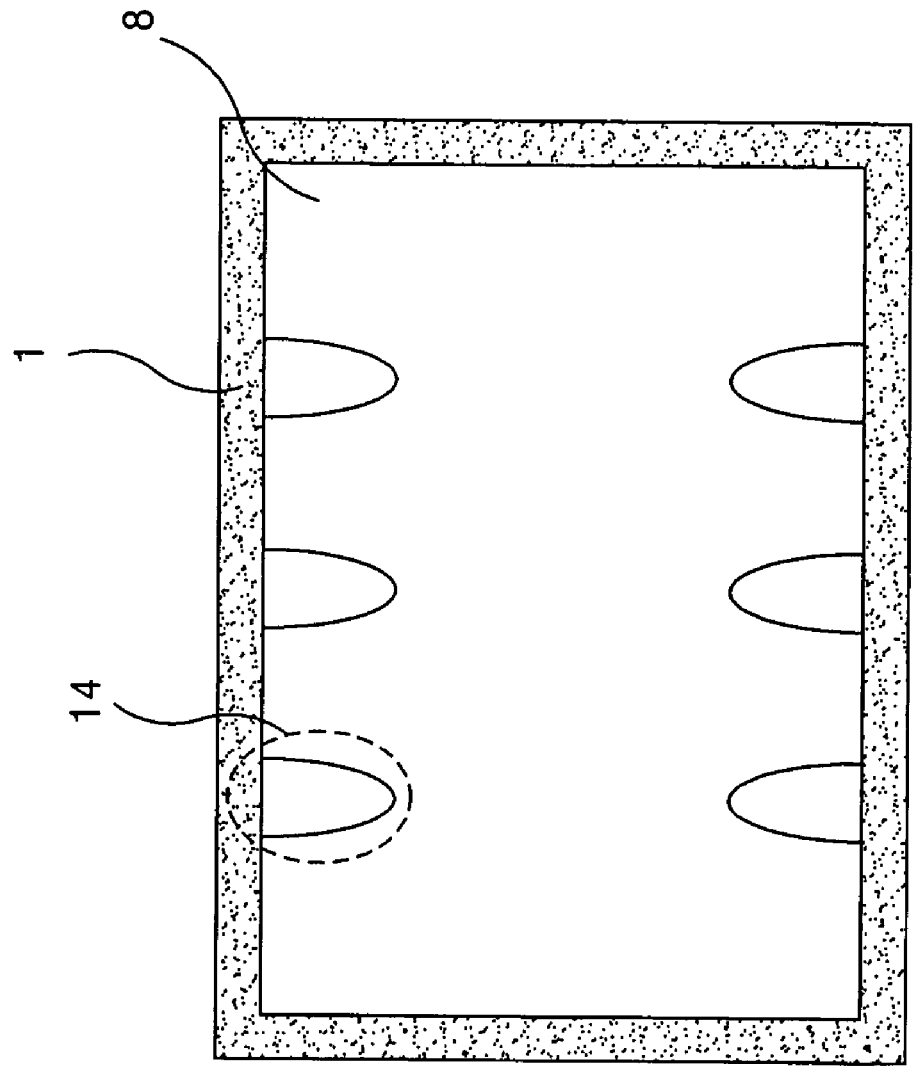
FIG. 3 is a plan view that illustrates the wrinkle generated at the optical sheet of FIG. 1.
Figure 4:
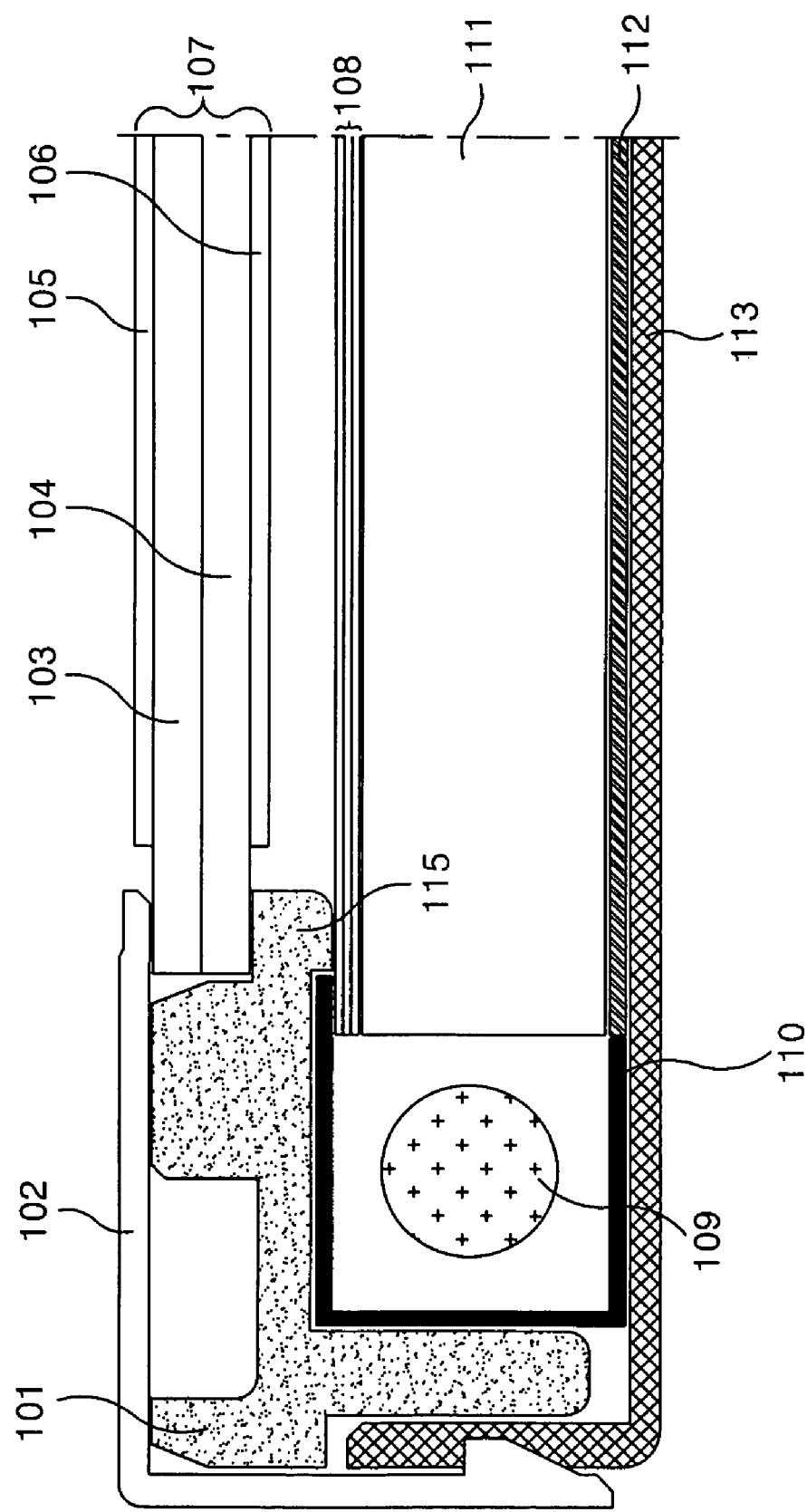
FIG. 4 is a cross sectional view that illustrates a liquid crystal display module according to a first embodiment.

As shown in FIG. 4, a liquid crystal display module according to a first embodiment includes a backlight unit. A liquid crystal display panel 107 receives a light from the backlight unit to display a picture. A case supports the liquid crystal display module and protects from external impact. A bottom cover 113 and a top case 102 being a sash member.

The backlight unit includes a light source 109. A light guide panel 111 converts a light from the light source 109 into a surface light. A housing 110 receives the light source 109 and has an open part that is opened to the light incidence surface of the light guide panel 111 and one end overlaps with the light guide panel 111. A main support 101 encompasses the side surface and upper surface of the housing 110 and supports the liquid crystal display panel. A plurality of optical sheets 108 are disposed on the light guide panel 111 and one end is inserted into a space between the one end of the housing 110 and the light guide panel 111. A reflection plate 112 faces the lower surface of the light guide panel 111.

The light source 109 generates the light. A cold cathode fluorescent lamp CCFL, a hot cathode fluorescent lamp HCFL, an external electrode fluorescent lamp EEFL, a light emitting diode LED, may be used as the light source 109.

The light guide panel 111 converts the incident light from the light source 109 through the light incidence surface into a surface light. The light guide panel 111 is generally formed of a transparent acryl resin that has high strength so as not to be broken or deformed easily.

The housing 110 receives the light source 109, and has an open part that is opened to the light incidence surface of the light guide panel 111 and one end that overlaps with at least a part of the upper surface of the light guide panel 111. The housing 110 is formed of a metal material such as aluminum. The reflection plate is bonded to the inner surface, or a metal plating surface of a reflective material is formed on the inner surface in order to reduce the loss of the light that is incident to the light guide panel 111.

The support main 101 encompasses the upper surface and side surface of the housing 110. The main support 101 includes a projected part 115 that extends from the upper side part of the housing 110 and overlaps at least a part of the light guide panel 111 with a space therebetween. The lower surface of the projected part 115 contacts an upper surface of the one end of the optical sheets 108.

The optical sheets 108 are disposed on the light guide panel 111 and have one end inserted into a space formed between the light guide panel 111 and the one end of the housing 110. When a projected part 115 is included in the main support, the one end of the optical sheets 108 is inserted into a space between the light guide panel 111 and the projected part 115 of the main support 101 and the one end of the housing 110. The optical sheets 108 are located between the light guide panel 111 and the liquid crystal display panel 107. The optical sheet uniformly disperses the light from the light guide panel 107 to the whole surface of a picture display part of the liquid crystal display panel 107, and increases light efficiency.

The optical sheets 108 include a diffusion sheet that makes a picture displayed in the liquid crystal display panel 107 have an evenly-distributed brightness. The incident light from the light guide panel 111 is dispersed to the surface of the picture display part of the liquid crystal display panel 107 to be supplied thereto. A prism sheet increases the brightness of the picture displayed in the liquid crystal display panel 107 by making the incident light from the diffusion sheet progress in a fixed direction by an angle and a pitch of a prism shape. A protection sheet protects the prism sheet.

The reflection plate 112 is installed to face the lower surface of the light guide panel 111 to reflect the light that progresses to the lower surface of the light guide panel 111 to the upper surface of the light guide panel 111, thereby reduces light loss.

Figure 5A:
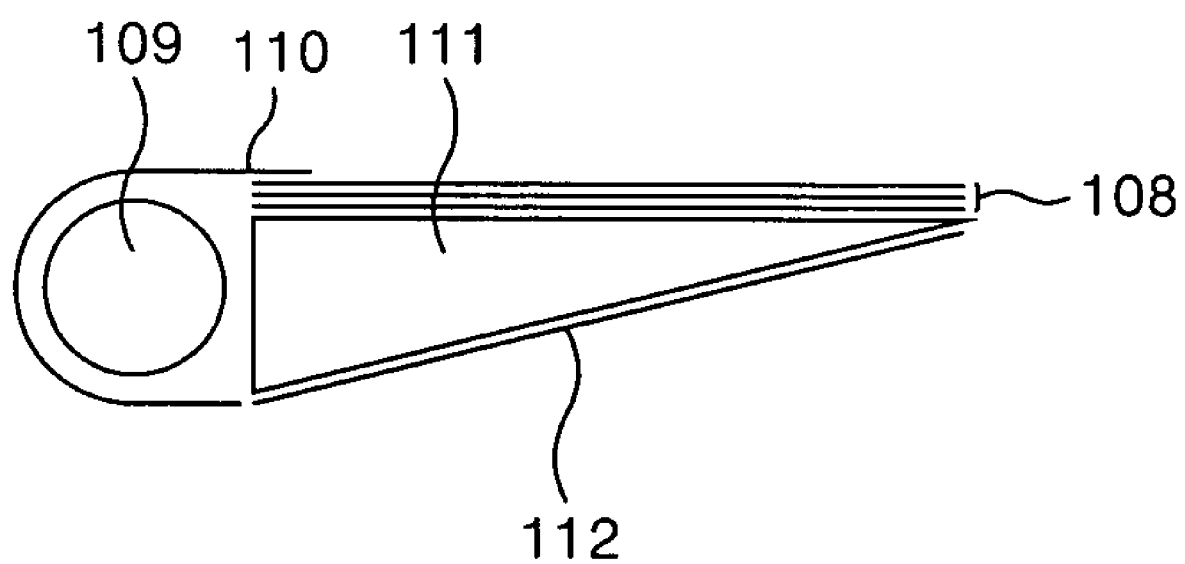
FIGS. 5A and 5B are views that illustrates a light source installation of a backlight unit of FIG. 4.
Figure 5B:
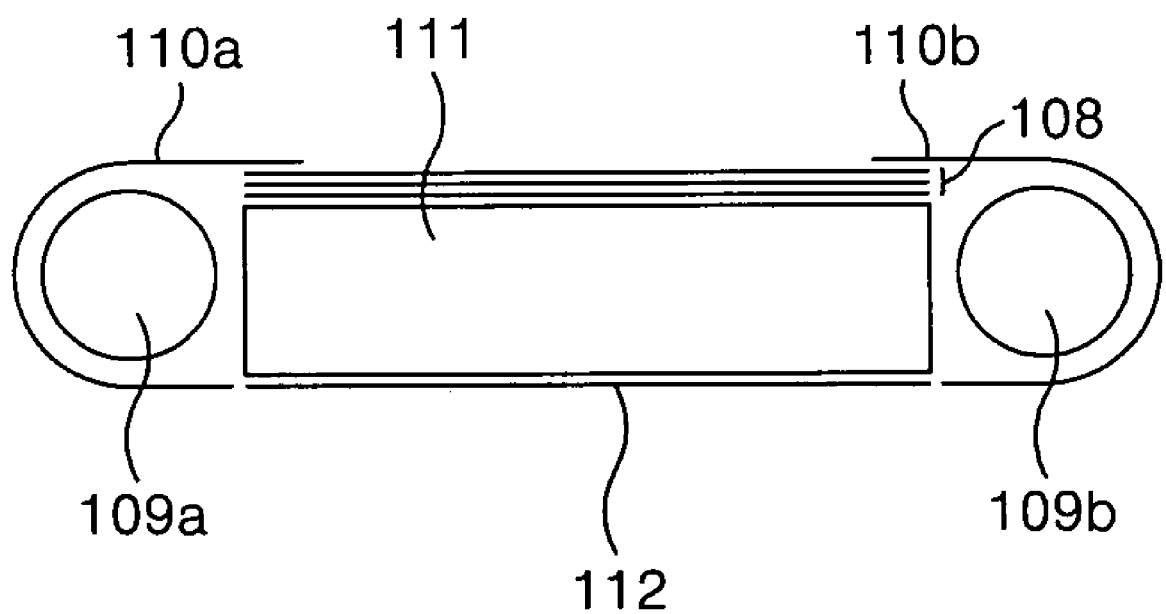

As described above, the backlight unit can include the light source 109 installed at one side of the light guide panel 111, as shown in FIG. 5A, or can include first and second light sources 109A, 109B installed at both ends of the light guide panel 111, as shown in FIG. 5B.

FIGS. 5A and 5B are views that illustrate the light source of the backlight unit shown in FIG. 4 installed in one side of the light guide panel 111 and a case where the light source of the backlight unit is installed in both sides of the light guide panel 111, respectively.

As shown in FIGS. 4 and 5B, the backlight unit where the first and second light sources 109A, 109B are included in both sides of the light guide panel 111 will be explained.

As illustrated in FIG. 5B, the backlight unit includes a first light source 109A. A first housing 110A receives the first light source 109A. An open part that is opened to a first light incidence surface of the light guide panel 111 and one end overlaps the light guide panel 111. The backlight unit includes a second light source 109B disposed in a different side from the first light source 109A. A second housing 110B receives the second light source 109B, and has an open part that is opened to a second light incidence surface of the light guide panel 111 and one end that overlaps with the light guide panel 111.

The backlight unit includes the main support 101. The main support 101 encompasses the side and upper surfaces of the first and second housings 110A, 110B and supports the liquid crystal display panel 107, as shown in FIG. 4. The main support 101 includes projected parts that are extend from the upper ends of the housings 110A, 110B and overlap with at least a part of the light guide panel 111 with a space therebetween. The backlight unit includes optical sheets 108 that have one end inserted into a space formed between the light guide panel 111 and the one end of the first housing 110A and the other end inserted into a space formed between the light guide panel 111 and the one end of the second housing 110B. When the projected part 115 is included in the main support 101, the one end of the optical sheets 108 is inserted into a space formed between the light guide panel 111 and the projected part 115 (refer to FIG. 4) of the support main and the one end of the first housing 110A. The other end the optical sheets 108 is inserted into a space formed between the light guide panel 111 and the projected part (not shown) of the main support and the one end of the second housing 110B.

As shown in FIG. 4, the cover bottom 113 is installed to encompass the lower surface of the liquid crystal display module and the side surface of the main support 101.

The top case 102 is installed to encompass the upper and side surfaces of the support main 101 and the edge of the liquid crystal display panel 107 and is combined with the bottom cover 113 at the side surface of the support main 101. The top case 102 encompasses the edge of the liquid crystal display panel 107 to protect the liquid crystal display panel 107 from an external impact.

The liquid crystal display panel 107 includes an upper plate 103 where a black matrix, a color filter array, a common electrode and an alignment film are disposed on a substrate. A lower plate 104 has a TFT array, a pixel electrode, an alignment film disposed on a substrate. An upper polarizer 105 is disposed on the upper plate 103. A lower polarizer 106 is disposed under the lower plate 104. A spacer (not shown) maintains a gap between the upper plate 103 and the lower plate 104. A liquid crystal layer is injected into a space between the upper and lower plates 103, 104. The upper plate 103 and the lower plate 104 are bonded by a sealant.

A liquid crystal display module according to a second embodiment will be explained in detail in reference to FIGS. 6, 7A and 7B.

Figure 6:
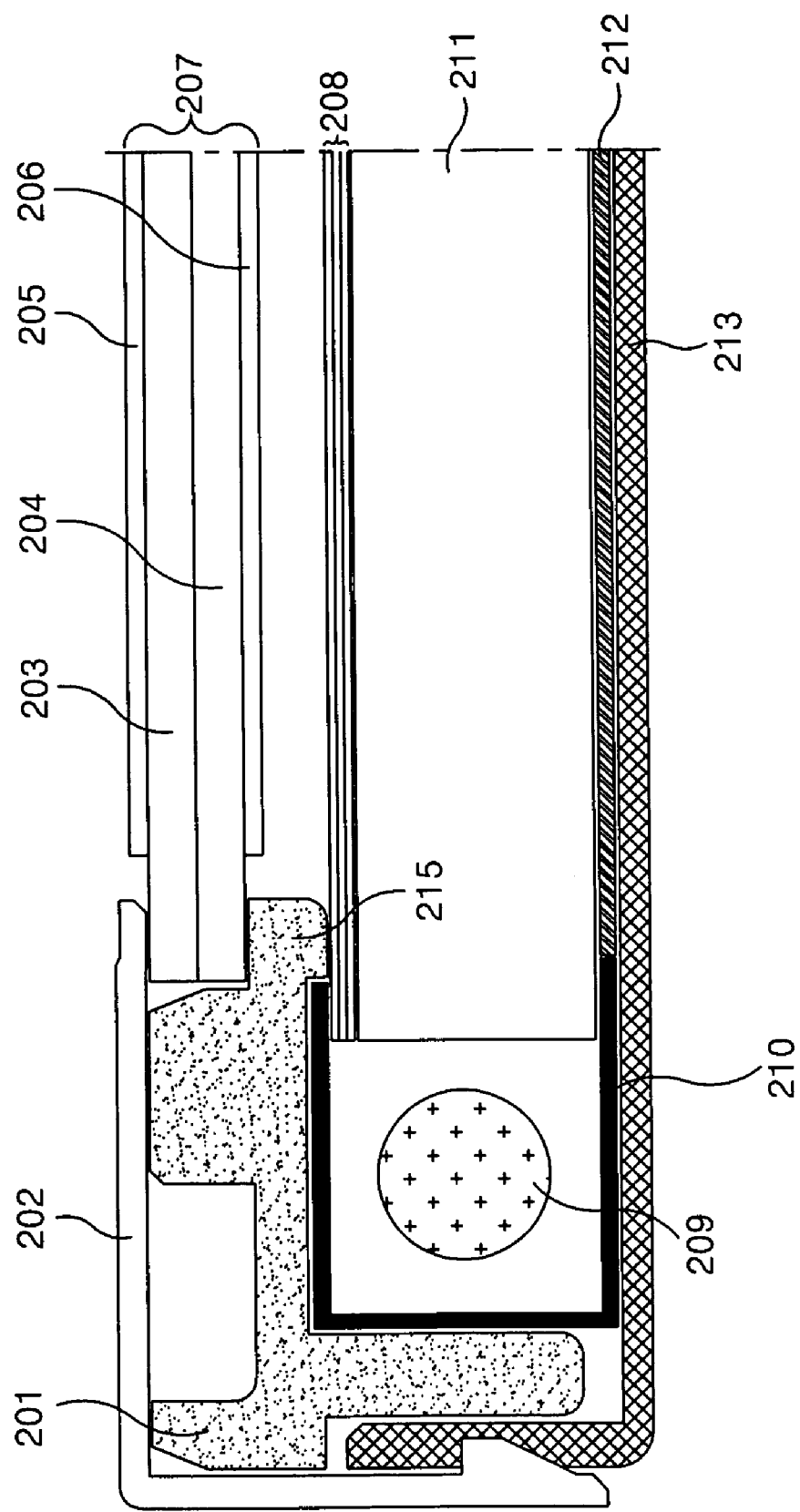
FIG. 6 is a cross sectional diagram that illustrates a liquid crystal display module according to a second embodiment.

As shown in FIG. 6, a liquid crystal display module according to a second includes a backlight unit. A liquid crystal display panel 207 receives a light from the backlight unit to display a picture. A case supports the liquid crystal display module and protects from external impact. A bottom cover 213 and a case top 202 being a sash member.

The backlight unit includes a light source 209. A light guide panel 211 converts a light from the light source into a surface light. A housing 210 overlaps with the upper surface of the light guide panel 211 where the optical sheets 208 are disposed and the other end overlapped with the lower surface of the light guide panel 211. A main support 201 encompasses the side surface and upper surface of the housing 210 and supports the liquid crystal display panel 207. A plurality of optical sheets 208 is disposed on the light guide panel 211 and has one end inserted into a space between the one end of the housing 210 and the light guide panel 211. A reflection plate 212 is installed to face the lower surface of the light guide panel 211.

The light source 209 generates the light. A cold cathode fluorescent lamp CCFL, a hot cathode fluorescent lamp HCFL, an external electrode fluorescent lamp EEFL, a light emitting diode LED, may be used as the light source 209.

The light guide panel 211 converts the incident light from the light source 209 through the light incidence surface into a surface light. The light guide panel 211 is generally formed of a transparent acryl resin that has high strength so as not to be broken or deformed easily.

The housing 210 is formed to receive the light source 209, and has an open part opened to the light incidence surface of the light guide panel 211. One end overlaps with at least a part of the upper surface of the light guide panel 211 and the other end overlaps with at least a part of the lower surface of the light guide panel 211. The housing 210 is formed of a metal material, for example, such as aluminum. The reflection plate is bonded to the inner surface, or a metal plating surface of a reflective material is disposed on the inner surface in order to reduce the loss of the light that is incident to the light guide panel 211.

The main support 201 encompasses the upper surface and side surface of the housing 210. The main support 201 can include a projected part 215 formed that extends from the upper side part of the housing 210 and overlaps at least a part of the light guide panel 211 with a space therebetween.

The optical sheets 208 are disposed on the light guide panel 211 and have one end inserted into a space between the light guide panel 211 and the one end of the housing 210. When a projected part 215 is included in the main support, the one end of the optical sheets 208 is inserted into a space between the light guide panel 211 and the projected part 215 of the main support 201 and the one end of the housing 210. The optical sheets 208 are located between the light guide panel 211 and the liquid crystal display panel 207. The optical sheets uniformly disperse the light from the light guide panel 207 to the whole surface of a picture display part of the liquid crystal display panel 207, and increases light efficiency.

The optical sheets 208 include a diffusion sheet that makes a picture displayed in the liquid crystal display panel 207 have an evenly-distributed brightness by making the incident light from the light guide panel 211 dispersed to the whole surface of the picture display part of the liquid crystal display panel 207. A prism sheet increases the brightness of the picture displayed in the liquid crystal display panel 207 by making the incident light from the diffusion sheet progress in a fixed direction by an angle and a pitch of a prism shape. A protection sheet protects the prism sheet.

The reflection plate 212 is installed to face the lower surface of the light guide panel 211 to reflect the light that progresses to the lower surface of the light guide panel 211 to the upper surface of the light guide panel 211, thereby reducing light loss.

Figure 7A:
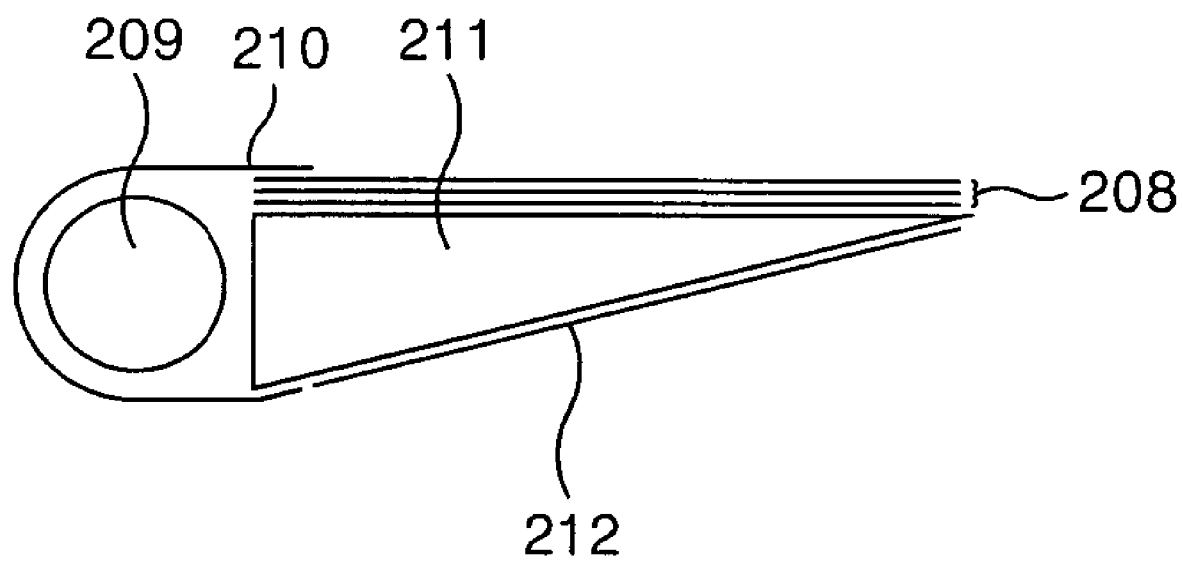
FIGS. 7A and 7B are views that illustrate a light source installation of a backlight unit of FIG. 6.
Figure 7B:
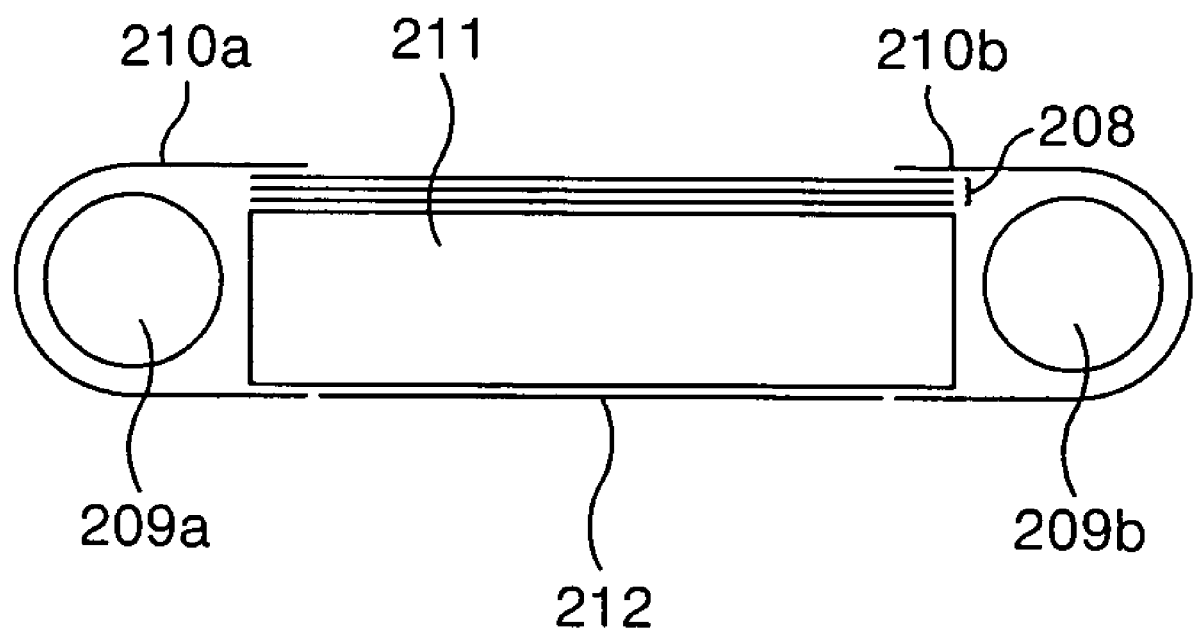

As described above, the backlight unit can include the light source 209 installed at one side of the light guide panel 211, as shown in FIG. 7A, or can include first and second light sources 209A, 209B installed at one side and the other side of the light guide panel 211, as shown in FIG. 7B.

FIGS. 7A and 7B are views that illustrate a case that the light source of the backlight unit shown in FIG. 6 are installed in one side of the light guide panel 211 and a case that the light source of the backlight unit is installed in both sides of the light guide panel 211, respectively.

The backlight unit where the first and second light sources 209A, 209B are included in both sides of the light guide panel 211 will be explained in reference to FIGS. 6 and 7B.

As shown in FIG. 7B, the backlight unit includes a first light source 209A. A first housing 210A receives the first light source 209A, and has an open part that is opened to a first light incidence surface of the light guide panel 211, one end overlapped with at least a part of the upper surface of the light guide panel 211 with a space therebetween and the other end overlapped with at least a part of the lower surface of the light guide panel 211.

The backlight unit further includes a second light source 209B disposed in a different side from the first light source 209A. A second housing 210B receives the second light source 209B, and has an open part that is opened to a second light incidence surface of the light guide panel 211. One end overlaps with the upper surface of the light guide panel 211 with a space therebetween and the other end overlaps with at least a part of the lower surface of the light guide panel 211. The backlight unit includes the main support 201. The main support 201 encompasses the side and upper surfaces of the first and second housings 210A, 210B and supports the liquid crystal display panel 207. The main support 207 can include projected parts 215 (refer to FIG. 6) that extend from the upper ends of the housings 210A, 210B and overlap with at least a part of the light guide panel 211 with a space therebetween.

The backlight unit includes optical sheets 208. The optical sheets have one end inserted into a space formed between the light guide panel 211 and the one end of the first housing 210A, and the other end inserted into a space between the light guide panel 211 and the second housing 210B. When the projected part 215 is included in the main support 201, the one end of the optical sheets 208 is inserted into a space between the light guide panel 211 and the projected part 215 (refer to FIG. 6) of the main support and the one end of the first housing 210A. The other end of the optical sheets 208 are inserted into a space formed between the light guide panel 211 and the projected part (not shown) of the main support and the one end of the second housing 210B.

As shown in FIG. 6, the bottom cover 213 is installed to encompass the lower surface of the liquid crystal display module and the side surface of the main support 201.

The top case 202 is installed to encompass the upper and side surfaces of the main support 201 and the edge of the liquid crystal display panel 207 and is combined with the bottom cover 213 at the side surface of the support main 201. The top case 202 encompasses the edge of the liquid crystal display panel 207 to protect the liquid crystal display panel 207 from external impact.

The liquid crystal display panel 207 includes an upper plate 203 where a black matrix, a color filter array, a common electrode and an alignment film are sequentially disposed on a substrate. A lower plate 204 has a TFT array, a pixel electrode, an alignment film disposed on a substrate. An upper polarizer 205 disposed on the upper plate 203. A lower polarizer 206 disposed under the lower plate 204. A spacer (not shown) maintains a gap between the upper plate 203 and the lower plate 204. A liquid crystal layer is injected into a space between the upper and lower plates 203, 204. The upper plate 203 and the lower plate 204 are bonded by the sealant.

A liquid crystal display module according to a third embodiment will be explained in detail in reference to FIGS. 8, 9A and 9B.

As shown in FIG. 8, a liquid crystal display module according to a third embodiment includes a backlight unit. A liquid crystal display panel 307 receives a light from the backlight unit to display a picture. A case that supports the liquid crystal display module and protects from external impact. A bottom cover 313 and a top case 302 being a sash member.

The backlight unit includes a light source 309. A light guide panel 311 converts a light from the light source into a surface light. A housing 310 has one end that overlaps with the upper surface of the light guide panel 311 where the optical sheets 308 are disposed and the other end overlaps with the reflection plate 312 and the lower surface of the light guide panel 311. A main support 301 encompasses the side surface and upper surface of the housing 310 and supports the liquid crystal display panel. A plurality of optical sheets 308 are disposed on the light guide panel 311 and have one end inserted into a space between the one end of the housing 310 and the light guide panel 311. A reflection plate 312 is installed to face the lower surface of the light guide panel 311.

The light source 309 generates light. A cold cathode fluorescent lamp CCFL, a hot cathode fluorescent lamp HCFL, an external electrode fluorescent lamp EEFL, a light emitting diode LED, may be used as the light source 309.

The light guide panel 311 converts the incident light from the light source 309 through the light incidence surface into a surface light. The light guide panel 311 is generally formed of a transparent acryl resin that has a high strength so as not to be broken or deformed easily.

The housing 310 receives the light source 309. The housing 310 has an open part that is opened to the light incidence surface of the light guide panel 311. One end overlaps with at least a part of the upper surface of the light guide panel 311. The other end overlaps with at least a part of the reflection plate 312 and the lower surface of the light guide panel 311. The housing 310 is formed of a metal material such as aluminum. The reflection plate is bonded to the inner surface, or a metal plating surface of a reflective material is formed on the inner surface in order to reduce the loss of the light which is incident to the light guide panel 311.

The main support 301 encompasses the upper surface and side surface of the housing 310. The main support 301 can include a projected part 315 that extends from the upper side part of the housing 310 and overlaps at least a part of the light guide panel 311 with a space therebetween.

The optical sheets 308 are disposed on the light guide panel 311 and have one end inserted into a space between the light guide panel 311 and the one end of the housing 310. In case that a projected part 315 is included in the main support, the one end of the optical sheets 308 is inserted into a space formed between the light guide panel 311 and the projected part 315 of the main support 301 and the upper end of the housing 310. The optical sheets 308 are located between the light guide panel 311 and the liquid crystal display panel 307. The optical sheets uniformly disperse the light from the light guide panel 307 to the surface of a picture display part of the liquid crystal display panel 307, and increases light efficiency.

The optical sheets 308 include a diffusion sheet that makes a picture displayed in the liquid crystal display panel 307 have an evenly-distributed brightness by making the incident light from the light guide panel 311 dispersed to the whole surface of the picture display part of the liquid crystal display panel 307 to be supplied thereto. A prism sheet increases the brightness of the picture displayed in the liquid crystal display panel 307 by making the incident light from the diffusion sheet progress in a fixed direction by an angle and a pitch of a prism shape. A protection sheet protects the prism sheet.

The reflection plate 312 is installed to face the lower surface of the light guide panel 311 to reflect the light that progresses to the lower surface of the light guide panel 311 to the upper surface of the light guide panel 311, thereby acts to reduce light loss.

Figure 9A:
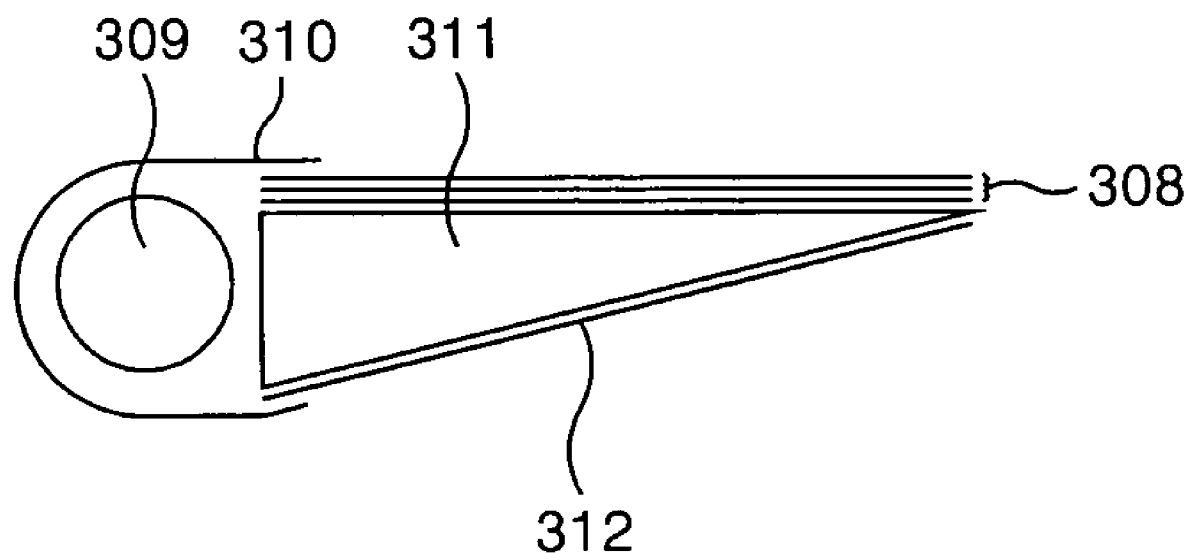
FIGS. 9A and 9B are views that illustrates a light source installation of a backlight unit of FIG. 8.
Figure 9B:
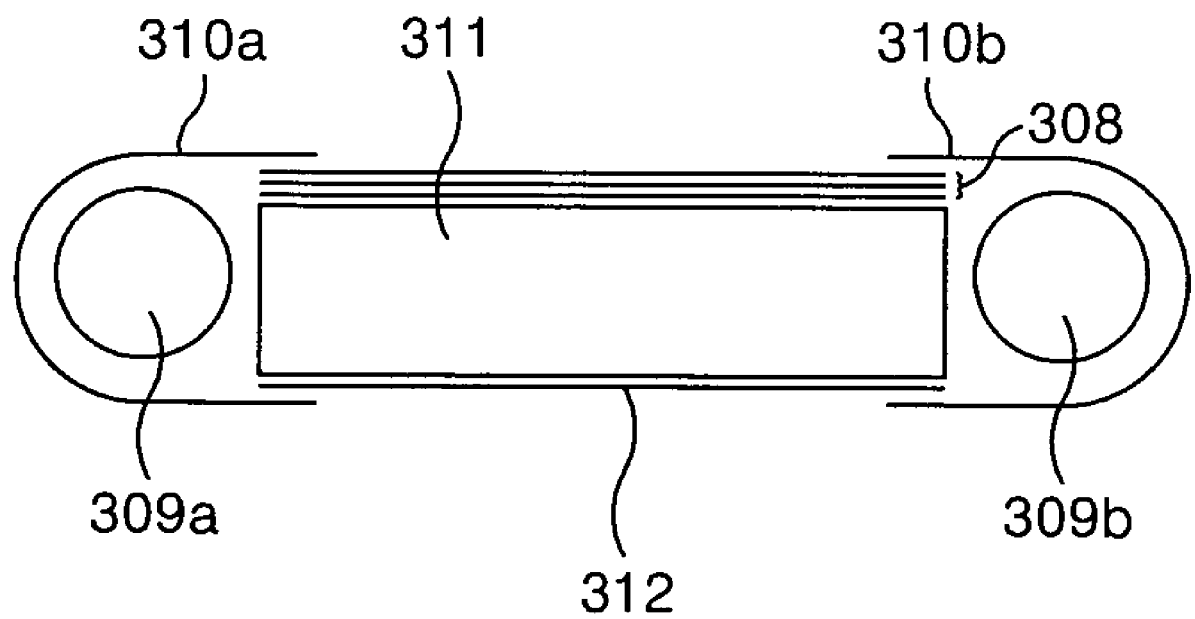

As described above, the backlight unit includes the light source 309 installed at one side of the light guide panel 311, as shown in FIG. 9A, or can include first and second light sources 309A, 309B installed at one side and the other side of the light guide panel 311, as shown in FIG. 9B.

FIGS. 9A and 9B a reviews that illustrate the light source of the backlight unit shown in FIG. 8 installed in one side of the light guide panel 311 and the light source of the backlight unit installed in both sides of the light guide panel 311, respectively.

The backlight unit where the first and second light sources 309A, 309B are included in both sides of the light guide panel 311 will be explained in reference to FIGS. 8 and 9B.

As illustrated in FIG. 9B, the backlight unit includes a first light source 309A. A first housing 310A receives the first light source 309A, and has an open part that is opened to a first light incidence surface of the light guide panel 311. One end overlaps with at least a part of the upper surface of the light guide panel 311 where the optical sheets 308 are disposed with a space therebetween. The other end overlaps with at least a part of the reflection plate 312 and the lower surface of the light guide panel 311.

The backlight unit further includes a second light source 309B. A second housing 310B receives the second light source 209B, and has an open part that is opened to a second light incidence surface of the light guide panel 311. One end overlaps with at least a part of the upper surface of the light guide panel 311 where the optical sheets 308 are disposed with a space therebetween. The other end overlaps with at least a part of the reflection plate 312 and the lower surface of the light guide panel 311. The backlight unit includes the main support 301, and the main support 301 encompasses the side and upper surfaces of the first and second housings 310A, 310B and supports the liquid crystal display panel 307. The main support 301 can include projected parts 315 (refer to FIG. 8) that extend from the upper ends of the housings 310A, 310B and overlap with at least a part of the light guide panel 311 with a space therebetween.

The backlight unit includes the optical sheets 308. The optical sheets have one end inserted into a space formed between the light guide panel 311 and the first housing 310A, and the other end inserted into a space between the light guide panel 311 and the second housing 310B. When the projected part 315 is included in the support main 301, the one ends of the optical sheets 308 are inserted into a space formed between the light guide panel 311 and the projected part 315 (FIG. 8) of the support main 301 and the upper end of the first housing 310A. The other end of the optical sheets 308 are inserted into a space formed between the light guide panel 311 and another projected part (not shown) of the main support 310 and the one end of the second housing 210B.

As shown in FIG. 8, the cover bottom 313 is installed to encompass the lower surface of the liquid crystal display module and the side surface of the support main 301.

The top case 302 encompasses the upper and side surfaces of the main support 301 and the edge of the liquid crystal display panel 307 and is combined with the bottom cover 313 at the side surface of the main support 301. The top case 302 encompasses the edge of the liquid crystal display panel 307 to protect the liquid crystal display panel 307 from an external impact.

The liquid crystal display panel 307 includes an upper plate 303 where a black matrix, a color filter array, a common electrode and an alignment film are disposed on a substrate. A lower plate 304 has a TFT array, a pixel electrode, an alignment film are sequentially formed on a substrate. An upper polarizer 305 is disposed on the upper plate 303. A lower polarizer 306 is disposed under the lower plate 304. A spacer (not shown) maintains a gap between the upper plate 303 and the lower plate 304. A liquid crystal layer is injected into a space between the upper and lower plates 303, 304. The upper plate 303 and the lower plate 304 are bonded by the sealant.

As described above, the backlight unit and the liquid crystal display module inserts the optical sheets between the housing and the light guide panel to fix the optical sheets. This prevents the wrinkle generated in the optical sheets, thus it is possible to improve the quality of the liquid crystal display module.

Although the embodiments shown in the drawings described above have been explained, it should be understood to the ordinary skilled person in the art that the embodiments are not limited to the description, but rather that various changes or modifications thereof are possible without departing from the spirit of the invention. Accordingly, the scope of the invention shall be determined only by the appended claims and their equivalents.

What is claimed is:

1. A backlight unit, comprising:
   at least one light source;
   a light guide panel that converts a light from the light source into a surface light;
   a housing that receives the light source, and has an open part that is opened to a light incidence surface of the light guide panel and one end that overlaps with at least a part of the light guide panel;
   a main support that encompasses side and upper surfaces of the housing;
   optical sheets disposed on the light guide panel, wherein the optical sheets have one end inserted between the light guide panel and the one end of the housing;
   a bottom cover installed to encompass side surface of the main support; and
   a projected part disposed extended the one end of the main support,
   wherein the projected part extends from the upper side part of the housing,
   wherein the projected part overlaps at least on the one end of the optical sheets, and
   wherein lower surface of the projected part contacts an upper surface of the one end of the optical sheets.

2. The backlight unit according to claim 1, wherein the main support includes:
   The projected part overlaps at least a part of the light guide panel, wherein there is a space between the project part and the light guide panel.

3. The backlight unit according to claim 2, wherein the one ends of the optical sheets are disposed between the light guide panel and the one end of the main support and the one end of the housing.

4. The backlight unit according to claim 2, wherein the light source includes:
   a first light source disposed in one side of the light guide panel, and
   a second light source disposed in the other side of the light guide panel.

5. The backlight unit according to claim 4, wherein the housing includes:
   a first housing that receives the first light source, has an open part that is opened to a first light incidence surface of the light guide panel and one end overlapped with the light guide panel, and
   a second housing that receives the second light source, and has an open part that is opened to a second light incidence surface of the light guide panel and one end overlapped with the light guide panel; wherein the main support encompasses side and upper surfaces of the first and second housings.

6. The backlight unit according to claim 5, wherein the one ends of the optical sheets are disposed between the light guide panel and the one end of the first housing; and the other ends of the optical sheets are disposed between the light guide panel and the one end of the second housing.

7. The backlight unit according to claim 2, further comprising:
   a reflection plate installed to face a lower surface of the light guide panel, wherein the housing has one end that overlaps with an upper surface of the light guide panel where the optical sheets are disposed, and the other end overlaps with a lower surface of the light guide panel.

8. The backlight unit according to claim 2, further comprising:
   a reflection plate installed to face a lower surface of the light guide panel,
   wherein the housing has one end that overlaps with an upper surface of the light guide panel where the optical sheets are disposed, and the other end overlaps with the reflection plate and a lower surface of the light guide panel.

9. The backlight unit according to claim 1, wherein the one ends of the optical sheets are disposed between the light guide panel and the one end of the main support.

10. The backlight unit according to claim 1, wherein the light source includes:

a first light source disposed in one side of the light guide panel, and a second light source disposed in the other side of the light guide panel.

11. The backlight unit according to claim 10, wherein the housing includes:

a first housing that receives the first light source, and has an open part that is opened to a first light incidence surface of the light guide panel and one end overlaps with the light guide panel, and a second housing that receives the second light source, and having an open part that is opened to a second light incidence surface of the light guide panel and one end overlaps with the light guide panel;

wherein the main support encompasses side and upper surfaces of the first and second housings.

12. The backlight unit according to claim 11, wherein the one ends of the optical sheets are disposed between the light guide panel and the one end of the first housing; and the other ends of the optical sheets are disposed between the light guide panel and the one end of the second housing.

13. The backlight unit according to claim 1, further comprising:

a reflection plate installed to face a lower surface of the light guide panel, wherein the housing has one end that overlaps with an upper surface of the light guide panel where the optical sheets are disposed, and the other end overlaps with a lower surface of the light guide panel.

14. The backlight unit according to claim 1, further comprising:

a reflection plate installed to face a lower surface of the light guide panel, wherein the housing has one end that overlaps with an upper surface of the light guide panel where the optical sheets are disposed, and the other end overlaps with the reflection plate and a lower surface of the light guide panel.

15. A liquid crystal display module, comprising:

a liquid crystal display panel, wherein an upper plate and a lower plate are bonded together and liquid crystal molecules are injected between the upper and lower plates; and a backlight unit that includes: one light source, a light guide panel that converts a light from the light source into a surface light, a housing that receives the light source, and has an open part that is opened to a light incidence surface of the light guide panel, and one end that overlaps with at least a part of the light guide panel, a main support for encompass side and upper surfaces of the housing, optical sheets disposed on the light guide panel, wherein the optical sheets have one ends inserted between the light guide panel and the one end of the housing, and a bottom cover installed to encompass side surface of the main support; and a projected part disposed extended the one end of the main support, wherein the projected part extends from the upper side part of the housing, wherein the projected part overlaps at least on the one end of the optical sheets, and wherein lower surface of the projected part contacts an upper surface of the one end of the optical sheets.

16. The liquid crystal display module according to claim 15, wherein the main support includes:

a projected part overlaps with at least a part of the light guide panel with a space therebetween.

17. The liquid crystal display module according to claim 16, wherein the one ends of the optical sheets are disposed between the light guide panel and the one end of the main support and the one end of the housing.

18. The liquid crystal display module according to claim 16, wherein the light source includes:

a first light source disposed in one side of the light guide panel, and a second light source disposed in the other side of the light guide panel.

19. The liquid crystal display module according to claim 18, wherein the housing includes:

a first housing that receives the first light source and has an open part that is opened to a first light incidence surface of the light guide panel and one end overlapped with the light guide panel, and a second housing that receives the second light source and haves an open part that is opened to a second light incidence surface of the light guide panel and one end overlapped with the light guide panel;

wherein the support main encompasses side and upper surfaces of the first and second housings.

20. The liquid crystal display module according to claim 19, wherein the one ends of the optical sheets are disposed between the light guide panel and the one end of the first housing; and the other ends of the optical sheets are disposed between the light guide panel and the one end of the second housing.

21. The liquid crystal display module according to claim 16, further comprising:

a reflection plate installed to face a lower surface of the light guide panel, wherein the housing has one end that overlaps with an upper surface of the light guide panel where the optical sheets are disposed, and the other end overlaps with a lower surface of the light guide panel.

22. The liquid crystal display module according to claim 16, further comprising:

a reflection plate installed to face a lower surface of the light guide panel, wherein the housing has one end that overlaps with an upper surface of the light guide panel where the optical sheets are disposed, and the other end overlaps with the reflection plate and a lower surface of the light guide panel.

23. The liquid crystal display module according to claim 15, wherein the one ends of the optical sheets are disposed between the light guide panel and the one end of the main support.

24. The liquid crystal display module according to claim 15, wherein the light source includes:

a first light source disposed in one side of the light guide panel, and a second light source disposed in the other side of the light guide panel.

25. The liquid crystal display module according to claim 24, wherein the housing includes:

a first housing that receives the first light source and has an open part that is opened to a first light incidence surface of the light guide panel and one end overlaps with the light guide panel, and a second housing that receives the second light source and has an open part that is opened to a second light incidence surface of the light guide panel and one end overlaps with the light guide panel;

wherein the main support encompasses side and upper surfaces of the first and second housings.

26. The liquid crystal display module according to claim 25, wherein the one ends of the optical sheets are disposed between the light guide panel and the one end of the first housing; and the one ends of the optical sheets are disposed between the light guide panel and the one end of the second housing.

27. The liquid crystal display module according to claim 15, further comprising:
- a reflection plate installed to face a lower surface of the light guide panel,
- wherein the housing has one end that overlaps with an upper surface of the light guide panel where the optical sheets are disposed, and the other end overlaps with a lower surface of the light guide panel.

28. The liquid crystal display module according to claim 15, further comprising:
- a reflection plate installed to face a lower surface of the light guide panel,
- wherein the housing has one end that overlaps with an upper surface of the light guide panel where the optical sheets are disposed, and the other end overlaps with the reflection plate and a lower surface of the light guide panel.

* * * * *